US012665704B2

(12) United States Patent
Dimou et al.

(10) Patent No.: US 12,665,704 B2
(45) Date of Patent: Jun. 23, 2026

(54) HYBRID AUTOMATIC REPEAT REQUEST FEEDBACK VERIFICATION

(71) Applicant: QUALCOMM Incorporated, San Diego, CA (US)

(72) Inventors: Konstantinos Dimou, New York City, NY (US); Yan Zhou, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 17/759,900

(22) PCT Filed: Feb. 26, 2021

(86) PCT No.: PCT/US2021/070203
§ 371 (c)(1),
(2) Date: Aug. 1, 2022

(87) PCT Pub. No.: WO2021/174261
PCT Pub. Date: Sep. 2, 2021

(65) Prior Publication Data
US 2023/0143786 A1 May 11, 2023

(30) Foreign Application Priority Data

Feb. 28, 2020 (GR) ............................... 20200100113

(51) Int. Cl.
H04L 1/1812 (2023.01)
H04B 7/06 (2006.01)
(Continued)

(52) U.S. Cl.
CPC ....... H04L 1/1812 (2013.01); H04B 7/06952 (2023.05); H04W 72/12 (2013.01); H04W 72/23 (2023.01)

(58) Field of Classification Search
CPC .............................. H04W 72/12; H04W 72/23
See application file for complete search history.

(56) References Cited

U.S. PATENT DOCUMENTS

2004/0223507 A1* 11/2004 Kuchibhotla ......... H04L 1/1671
370/428
2010/0257419 A1 10/2010 Sung et al.
(Continued)

FOREIGN PATENT DOCUMENTS

CN 101622811 A 1/2010
EP 3168999 A1 5/2017
WO 2019032882 A1 2/2019

OTHER PUBLICATIONS

International Search Report and Written Opinion—PCT/US2021/070203—ISA/EPO—Sep. 24, 2021.
(Continued)

*Primary Examiner* — Jackie Zuniga Abad
(74) *Attorney, Agent, or Firm* — Harrity & Harrity, LLP

(57) ABSTRACT

Various aspects of the present disclosure generally relate to wireless communication. In some aspects, a user equipment (UE) may transmit hybrid automatic repeat request (HARQ) feedback for a downlink transmission from a base station; receive an indication of an interpretation of the HARQ feedback by the base station; and determine whether the interpretation of the HARQ feedback by the base station is correct. Numerous other aspects are provided.

30 Claims, 9 Drawing Sheets

500

(51) Int. Cl.
  *H04W 72/12*     (2023.01)
  *H04W 72/23*     (2023.01)

(56)         References Cited

U.S. PATENT DOCUMENTS

| | | | | |
|---|---|---|---|---|
| 2011/0080880 | A1* | 4/2011 | Yin | H04L 1/1861 |
| | | | | 375/267 |
| 2017/0041104 | A1 | 2/2017 | Sung et al. | |
| 2017/0134964 | A1* | 5/2017 | Yu | H04L 5/005 |
| 2017/0141903 | A1* | 5/2017 | Xu | H04L 1/0026 |
| 2019/0342035 | A1 | 11/2019 | Zhang et al. | |
| 2020/0015250 | A1 | 1/2020 | Yang et al. | |
| 2020/0052831 | A1 | 2/2020 | Yang et al. | |
| 2020/0288359 | A1* | 9/2020 | Kim | H04W 36/026 |
| 2020/0374960 | A1* | 11/2020 | Deenoo | H04B 7/088 |

OTHER PUBLICATIONS

Partial International Search Report—PCT/US2021/070203—ISA/
EPO—Jun. 21, 2021.

* cited by examiner

500

810   Transmit HARQ feedback for a downlink transmission from a base station

820   Receive an indication of an interpretation of the HARQ feedback by the base station 830   Determine whether the interpretation of the HARQ feedback by the base station is correct

800

910 — Monitor, during a HARQ feedback occasion, for HARQ feedback from a UE

920 — Transmit, to the UE, an indication of an interpretation of the HARQ feedback based at least in part on monitoring for the HARQ feedback

900

HYBRID AUTOMATIC REPEAT REQUEST FEEDBACK VERIFICATION

CROSS-REFERENCE TO RELATED APPLICATIONS

This Patent Application is a 371 national stage of PCT Application No. PCT/US2021/070203 filed on Feb. 26, 2021, entitled "HYBRID AUTOMATIC REPEAT REQUEST FEEDBACK VERIFICATION," which claims priority to Greek Patent application Ser. No. 20/200100113, filed on Feb. 28, 2020, entitled "HYBRID AUTOMATIC REPEAT REQUEST FEEDBACK VERIFICATION." The disclosure of the prior Applications are considered part of and are hereby expressly incorporated by reference in this Patent Application.

FIELD OF THE DISCLOSURE

Aspects of the present disclosure generally relate to wireless communication and to techniques and apparatuses for hybrid automatic repeat request (HARQ) feedback verification.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include transmitting hybrid automatic repeat request (HARQ) feedback for a downlink transmission from a base station; receiving an indication of an interpretation of the HARQ feedback by the base station; and determining whether the interpretation of the HARQ feedback by the base station is correct.

In some aspects, a method of wireless communication, performed by a base station, may include monitoring, during a HARQ feedback occasion, for HARQ feedback from a UE; and transmitting, to the UE, an indication of an interpretation of the HARQ feedback based at least in part on monitoring for the HARQ feedback.

In some aspects, a UE for wireless communication may include a memory and one or more processors operatively coupled to the memory. The memory and the one or more processors may be configured to transmit HARQ feedback for a downlink transmission from a base station; receive an indication of an interpretation of the HARQ feedback by the base station; and determine whether the interpretation of the HARQ feedback by the base station is correct.

In some aspects, a base station for wireless communication may include a memory and one or more processors operatively coupled to the memory. The memory and the one or more processors may be configured to monitor, during a HARQ feedback occasion, for HARQ feedback from a UE; and transmit, to the UE, an indication of an interpretation of the HARQ feedback based at least in part on monitoring for the HARQ feedback.

In some aspects, a non-transitory computer-readable medium may store one or more instructions for wireless communication. The one or more instructions, when executed by one or more processors of a UE, may cause the one or more processors to transmit HARQ feedback for a downlink transmission from a base station; receive an indication of an interpretation of the HARQ feedback by the base station; and determine whether the interpretation of the HARQ feedback by the base station is correct.

In some aspects, a non-transitory computer-readable medium may store one or more instructions for wireless communication. The one or more instructions, when executed by one or more processors of a base station, may cause the one or more processors to monitor, during a HARQ feedback occasion, for HARQ feedback from a UE; and transmit, to the UE, an indication of an interpretation of the HARQ feedback based at least in part on monitoring for the HARQ feedback.

In some aspects, an apparatus for wireless communication may include means for transmitting HARQ feedback for a downlink transmission from a base station; means for receiving an indication of an interpretation of the HARQ feedback by the base station; and means for determining whether the interpretation of the HARQ feedback by the base station is correct.

In some aspects, an apparatus for wireless communication may include means for monitoring, during a HARQ feedback occasion, for HARQ feedback from a UE; and means for transmitting, to the UE, an indication of an interpretation of the HARQ feedback based at least in part on monitoring for the HARQ feedback.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
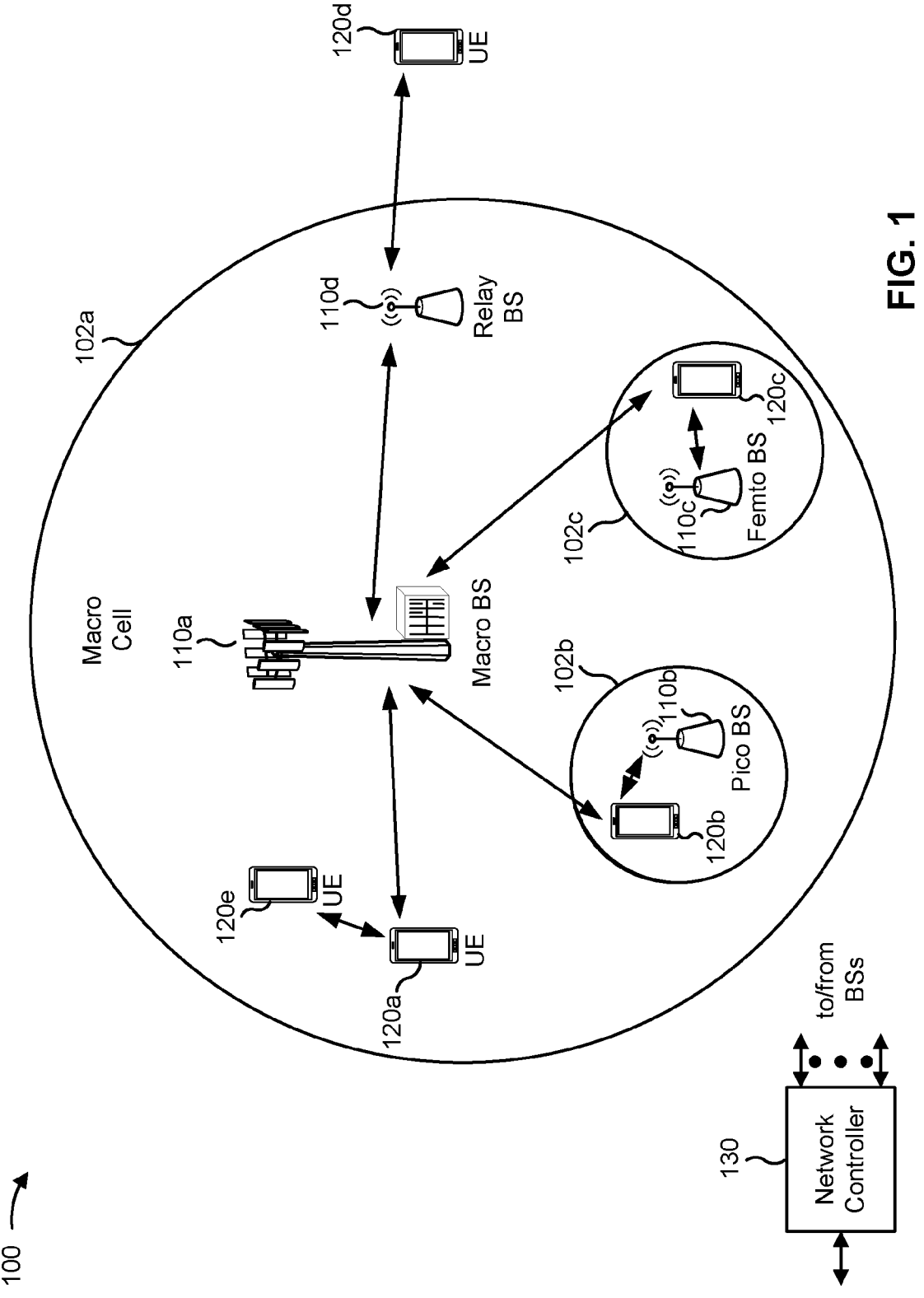
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
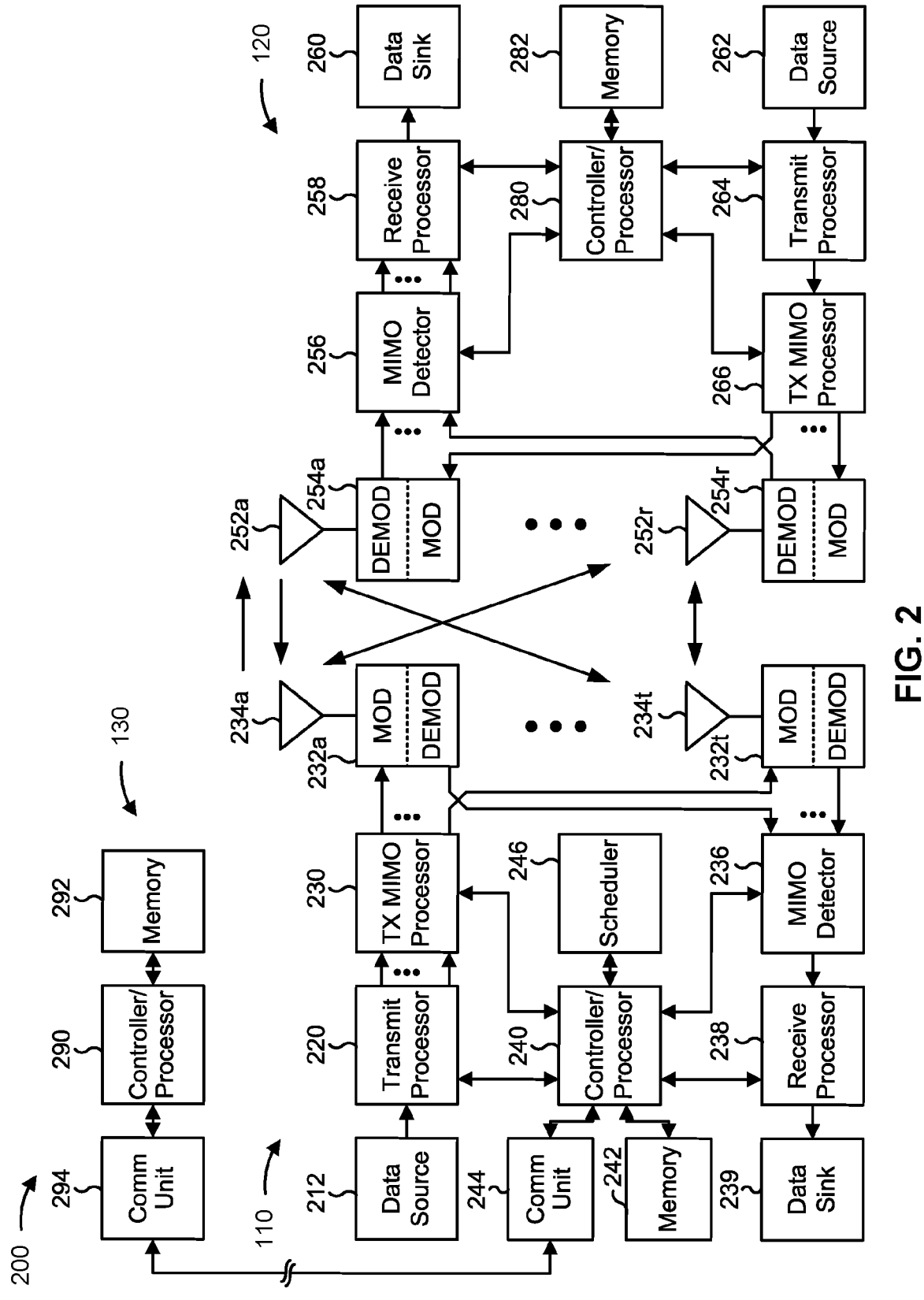
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-9.

Controller/processor 240 of base station 110, controller/processor 280 of UE 120, and/or any other component(s) of FIG. 2 may perform one or more techniques associated with HARQ feedback verification, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the UE includes means for transmitting hybrid automatic repeat request (HARQ) feedback for a downlink transmission from a base station; means for receiving an indication of an interpretation of the HARQ feedback by the base station; or means for determining whether the interpretation of the HARQ feedback by the base station is correct. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining that the interpretation of the HARQ feedback by the base station is incorrect; or means for transmitting a scheduling request to request a new transmission configuration indicator state.

In some aspects, the UE includes means for transmitting the scheduling request via a physical uplink control channel, or means for transmitting the scheduling request via a random access channel.

In some aspects, the UE includes means for transmitting the scheduling request to request the new transmission configuration indicator state via a current beam associated with the HARQ feedback, means for transmitting the scheduling request to request the new transmission configuration indicator state via a current beam not associated with the HARQ feedback, or means for transmitting the scheduling request to request the new transmission configuration indicator state via a new beam.

In some aspects, the UE includes means for determining that the interpretation of the HARQ feedback by the base station is incorrect; or means for transmitting, via a subsequent HARQ feedback, an indication of a mismatch between the HARQ feedback and the interpretation of the HARQ feedback by the base station.

In some aspects, the UE includes means for determining that the interpretation of the HARQ feedback by the base station is incorrect and a number of interpretations of previous consecutive HARQ feedbacks were incorrect; means for determining that a total number of the HARQ feedback and the number of previous consecutive HARQ feedbacks satisfy a threshold; or means for transmitting a scheduling request to request a new transmission configuration indicator state.

In some aspects, the UE includes means for transmitting the scheduling request via a physical uplink control channel, or means for transmitting the scheduling request via a random access channel.

In some aspects, the UE includes means for transmitting the scheduling request to request the new transmission configuration indicator state via a current beam associated with the HARQ feedback, means for transmitting the scheduling request to request the new transmission configuration indicator state via a current beam not associated with the HARQ feedback, or means for transmitting the scheduling request to request the new transmission configuration indicator state via a new beam.

In some aspects, the UE includes means for comparing the HARQ feedback that is stored and the indication of the interpretation of the HARQ feedback by the base station.

In some aspects, the UE includes means for receiving the indication of the interpretation of the HARQ feedback by the base station via a physical layer indication.

In some aspects, the base station includes means for monitoring, during a HARQ feedback occasion, for HARQ feedback from a UE; or means for transmitting, to the UE, an indication of an interpretation of the HARQ feedback based at least in part on monitoring for the HARQ feedback. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for determining, during the HARQ feedback occasion, that no HARQ feedback is received; or means for interpreting the determination as an acknowledgement.

In some aspects, the base station includes means for receiving, from the UE, a scheduling request to request a new transmission configuration indicator state based at least in part on the UE determining that the interpretation of the HARQ feedback is incorrect.

In some aspects, the base station includes means for receiving the scheduling request via a physical uplink control channel, or means for receiving the scheduling request via a random access channel.

In some aspects, the base station includes means for receiving the scheduling request to request the new transmission configuration indicator state via a current beam associated with a downlink transmission that is associated with the HARQ feedback, means for receiving the scheduling request to request the new transmission configuration indicator state via a current beam not associated with the downlink transmission that is associated with the HARQ feedback, or means for receiving the scheduling request to request the new transmission configuration indicator state via a new beam.

In some aspects, the base station includes means for receiving, via a subsequent HARQ feedback occasion, an indication of a mismatch between the interpretation of the HARQ feedback and the HARQ feedback transmitted by the UE.

In some aspects, the base station includes means for transmitting the indication of the interpretation of the HARQ feedback via a physical layer indication.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
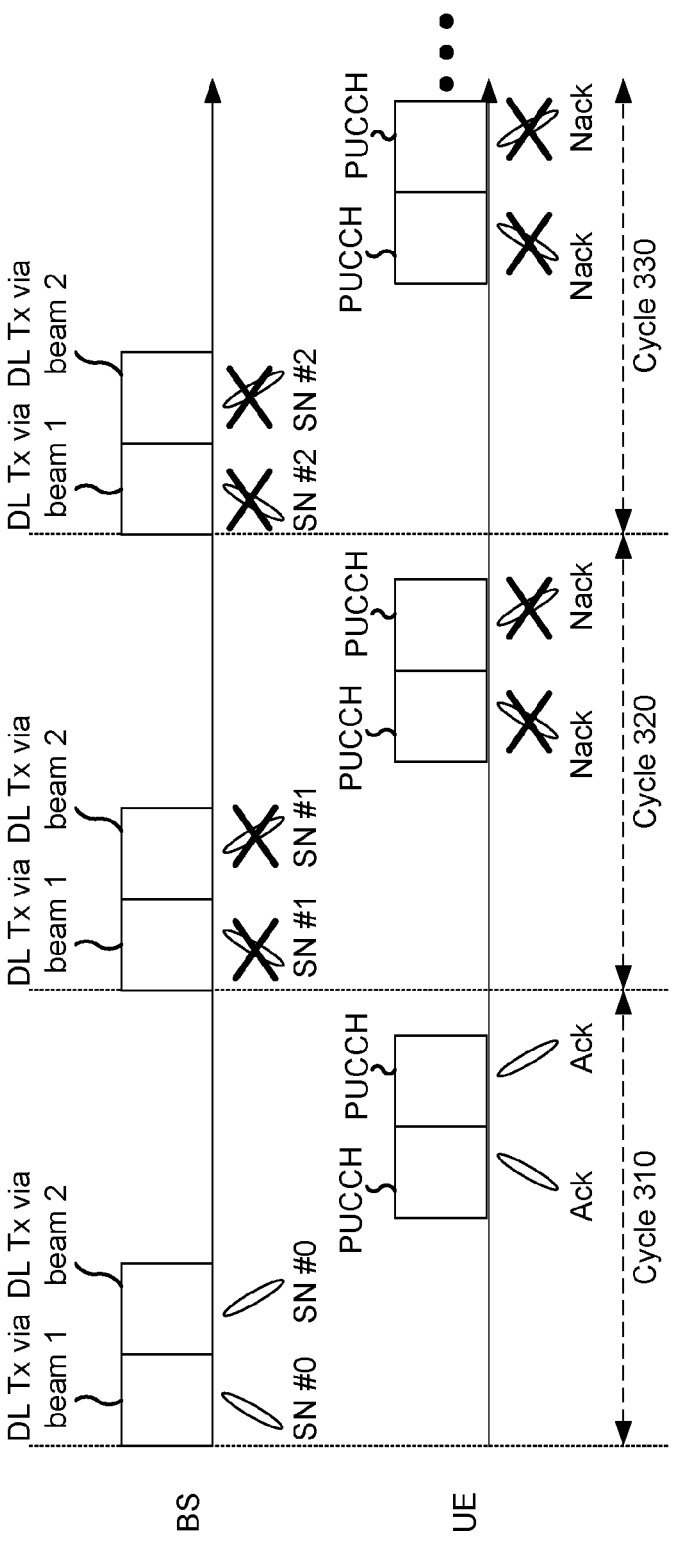
FIG. 3 is a diagram illustrating an example of hybrid automatic repeat request (HARQ) feedback, in accordance with the present disclosure.

FIG. 3 is a diagram illustrating an example 300 of HARQ feedback, in accordance with the present disclosure. As shown in FIG. 3, a base station and a UE may communicate downlink transmissions and HARQ feedback using one or more beams.

As shown in FIG. 3, and in cycle 310, the base station may transmit a downlink transmission, having a sequence number 0, via a beam 1 and a beam 2. The base station may transmit the downlink transmission using a physical downlink shared channel (PDSCH). The PDSCH may be scheduled using semi-persistent scheduling.

As further shown in cycle 310, the UE may transmit an acknowledgement (ACK) to indicate that the UE received the downlink transmission having the sequence number 0. The UE may transmit the ACK for sequence number 0 using a physical uplink control channel (PUCCH). The UE may transmit the ACK for sequence number 0 using one or more beams. When the PUCCH and the PDSCH have beam reciprocity, the UE may transmit the ACK for sequence number 0 using the beam 1 and/or the beam 2. The base station may receive the ACK from the UE to indicate that the UE received the downlink transmission having the sequence number 0.

As shown in cycle 320, the base station may transmit a downlink transmission, having a sequence number 1, via the beam 1 and the beam 2. As further shown, the UE may not receive the downlink transmission having the sequence number 1 (e.g., based at least in part on blocking, interference, and/or the like).

The UE may monitor for an occasion associated with the downlink transmission having the sequence number 1 (e.g., based at least in part on scheduling from the base station). Based at least in part on the UE not receiving the downlink transmission having the sequence number 1, the UE may transmit a negative acknowledgement (NACK) via the beam 1 and/or the beam 2. As further shown, the base station may not receive the NACK (e.g., based at least in part on blocking, interference, and/or the like).

In some configurations, the base station may be configured to interpret an occasion for HARQ feedback, in which no HARQ feedback is received, as an ACK. In these configurations, the base station may interpret an occasion, associated with receiving the HARQ feedback associated with the NACK of cycle 320, as an ACK instead of the intended NACK. This may be referenced as a NACK to ACK error or a mismatch of HARQ feedback.

As shown in cycle 330, the base station may transmit a downlink transmission, having a sequence number 2, via the beam 1 and the beam 2, based at least in part on failing to receive the NACK of cycle 320 that was intended to indicate that the UE did not receive a previous transmission using the beam 1 and the beam 2. As further shown, the UE may not receive the downlink transmission having the sequence number 2 (e.g., based at least in part on blocking, interference, and/or the like).

The UE may monitor for an occasion associated with the downlink transmission having the sequence number 2 (e.g., based at least in part on scheduling from the base station). Based at least in part on the UE not receiving the downlink transmission having the sequence number 2, the UE may transmit a NACK via beam 1 and/or the beam 2. As further shown, the base station may not receive the NACK (e.g., based at least in part on blocking, interference, and/or the like). Similar to cycle 320, the base station may interpret the failure to receive the NACK as an ACK.

The base station may continue to transmit downlink transmissions using the beam 1 and the beam 2 because the base station is unaware that the UE is not receiving the downlink transmissions. Based at least in part on the UE transmitting the NACK using the beam 1 and/or the beam 2, which may be blocked (e.g., by obstacles along paths associated with the beams), the UE may be unable to indicate to the base station that the downlink transmissions are not received by the UE. This may consume computing, communication, and network resources for unsuccessful attempts of communications between the base station and the UE.

As indicated above, FIG. 3 is provided as an example. Other examples may differ from what is described with respect to FIG. 3.

Figure 4:
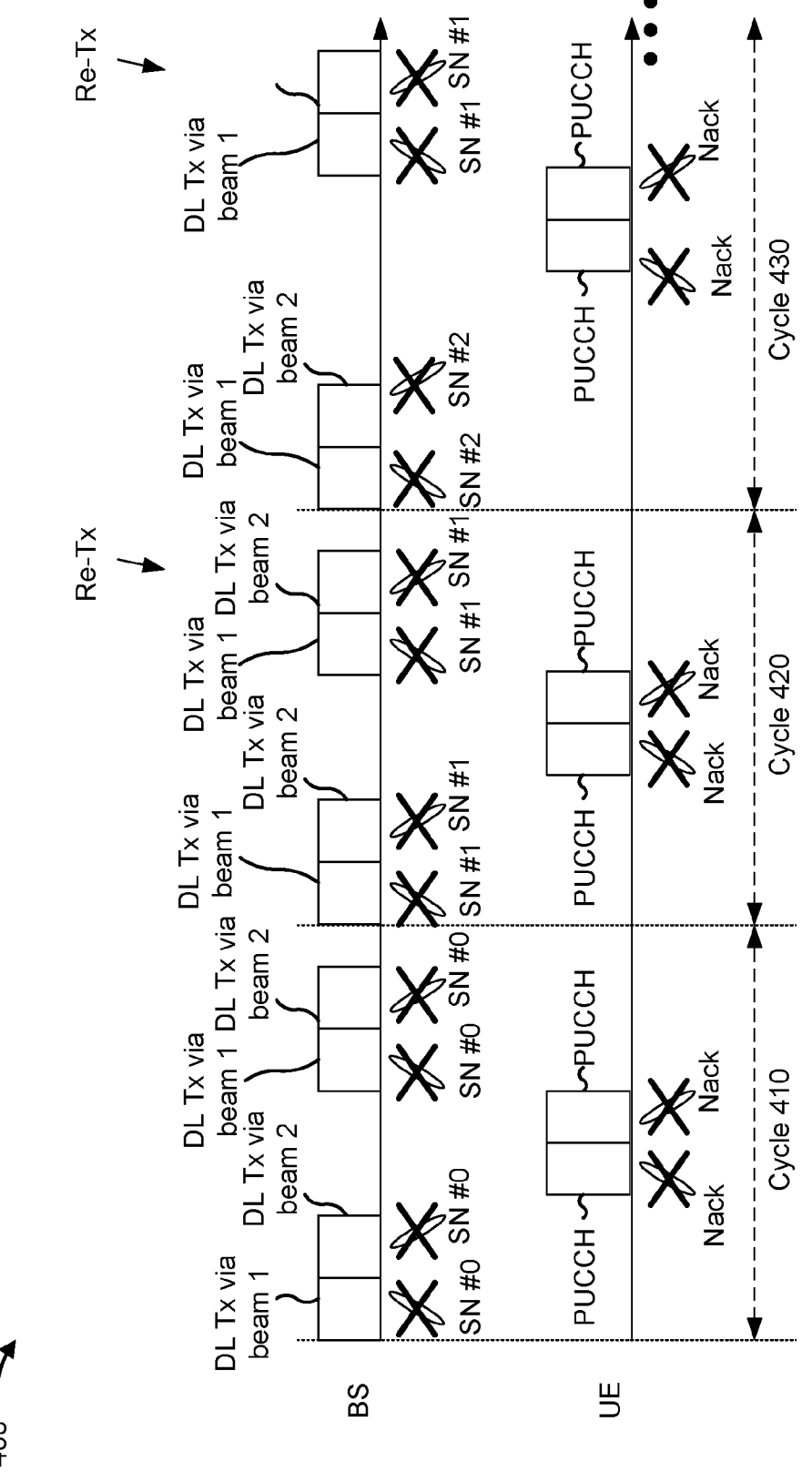
FIG. 4 is a diagram illustrating an example of HARQ feedback, in accordance with the present disclosure.

FIG. 4 is a diagram illustrating an example 400 of HARQ feedback, in accordance with the present disclosure. As shown in FIG. 4, a base station and a UE may communicate downlink transmissions and HARQ feedback using one or more beams.

As shown in FIG. 4, and in cycle 410, the base station may transmit a downlink transmission, having a sequence number 0, via a beam 1 and a beam 2. The base station may transmit the downlink transmission using a PDSCH. The PDSCH may be scheduled using semi-persistent scheduling.

As further shown in cycle 410, the UE may transmit a NACK, via the beam 1 and/or the beam 2, to indicate that the UE did not receive the downlink transmission having the sequence number 0. As shown, the base station may not receive the NACK. The base station may retransmit the downlink transmission having the sequence number 0 using the beam 1 and/or the beam 2. The base station may determine to retransmit the downlink transmission having the sequence number 0 based at least in part on interpreting an occasion, associated with receiving HARQ feedback for the transmission of the downlink transmission having the sequence number 0, as a NACK. The base station may interpret the occasion as a NACK based at least in part on not receiving any HARQ feedback during the occasion and based at least in part on a configuration of the UE to transmit either an ACK or a NACK (e.g., the UE is not configured for discontinuous transmission of HARQ feedback). Additionally, or alternatively, the base station may determine to retransmit the downlink transmission having the sequence number 0 based at least in part on a scheduled retransmission that is independent from the NACK.

As further shown in cycle 410, the UE does not have an occasion to transmit HARQ feedback associated with the retransmission of the downlink transmission associated with the sequence number 0. The UE may not receive the downlink transmission based at least in part on interference, the beam 1 and/or the beam 2 being blocked, and/or the like. Alternatively, the UE may receive (e.g., receive and decode) the downlink transmission based at least in part on compiling the retransmission of beam 1 and/or the retransmission of beam 2. In other words, even though the UE does not properly receive the downlink transmission via any single transmission, the UE may properly receive the downlink transmission using multiple transmissions.

As shown in cycle 420, the base station may transmit a downlink transmission, having a sequence number 1, via the beam 1 and the beam 2. The UE may transmit a NACK, via the beam 1 and/or the beam 2, to indicate that the UE did not receive the downlink transmission having the sequence number 1. As in cycle 410, the base station may not receive the NACK and may retransmit the downlink transmission having the sequence number 1 using the beam 1 and/or the beam 2. As in cycle 410, the UE does not have an occasion during cycle 420 to transmit HARQ feedback associated with the retransmission of the downlink transmission associated with the sequence number 1.

As shown in cycle 430, the base station may transmit a downlink transmission, having a sequence number 2, via the beam 1 and the beam 2. The UE may transmit a NACK, via the beam 1 and/or the beam 2, to indicate that the UE did not receive the downlink transmission having the sequence number 2. As in cycle 410, the base station may not receive the NACK and may retransmit the downlink transmission having the sequence number 2 using the beam 1 and/or the beam 2. As in cycle 410, the UE does not have an occasion during cycle 430 to transmit HARQ feedback associated with the retransmission of the downlink transmission associated with the sequence number 2.

Based at least in part on the UE not having an occasion to transmit the HARQ feedback during the cycles 410, 420, and 430, the base station may be unaware of whether the UE received the downlink transmissions. Instead, the base station may make assumptions of reception or non-reception of the downlink transmissions, and an incorrect assumption may consume computing, communication, and/or network resources to detect and correct.

As indicated above, FIG. 4 is provided as an example. Other examples may differ from what is described with respect to FIG. 4.

As described above, during some communications between a base station and a UE, the UE may be unable to provide HARQ feedback to the base station. For example, as in FIG. 3, the UE may be unable to provide the HARQ feedback based at least in part on blocking of one or more beams used to transmit the HARQ feedback, which may also be used to receive a downlink transmission associated with the HARQ feedback. In some communication systems, the base station may be configured to interpret an occasion, during which no HARQ feedback is received, as an ACK, which may be incorrect if a NACK is transmitted by the UE and not received by the base station. In another example, as in FIG. 4, the UE may not have an occasion to transmit the HARQ feedback based at least in part on a limited time budget of a cycle. Without receiving the HARQ feedback from the UE, the base station may make an assumption of whether the UE received the downlink transmission. If the assumption is incorrect, the UE and/or the base station may consume computing, communication, and/or network resources to detect and/or correct the incorrect assumption.

In some aspects described herein, a base station (e.g., base station 110) may transmit a downlink transmission, using one or more beams, to a UE (e.g., UE 120). The UE may monitor for the downlink transmission and determine whether the UE receives the downlink transmission. The UE may transmit HARQ feedback for the downlink transmission (e.g., a NACK if the UE does not receive the downlink transmission or an ACK if the UE receives the downlink transmission). The base station may monitor for the HARQ feedback. Based at least in part on whether the base station receives the HARQ feedback and/or an indication of the HARQ feedback, the base station may interpret the HARQ feedback.

The base station may transmit an indication of the interpretation of the HARQ feedback and the UE may receive the indication of the interpretation of the HARQ feedback. The UE may determine whether the interpretation of the HARQ feedback is correct. Based at least in part on determining that the interpretation of the HARQ feedback is incorrect, the UE may transmit a scheduling request to request a new transmission configuration indicator (TCI) state (e.g., to perform beam reselection, and/or to beam switch).

In other words, the base station may provide an indication of an interpretation of previous HARQ feedback for verification by the UE. In this way, the UE may be aware of a mismatch of HARQ feedback and may perform one or more actions to attempt to avoid additional mismatches of HARQ feedback. This may conserve computing, communication, and/or network resources that may otherwise have been used for the base station to continue transmitting multiple downlink transmissions that are not being received by the UE, to detect that the multiple downlink transmissions are not being received, and/or to recover from the UE not receiving the multiple transmissions.

Figure 5:
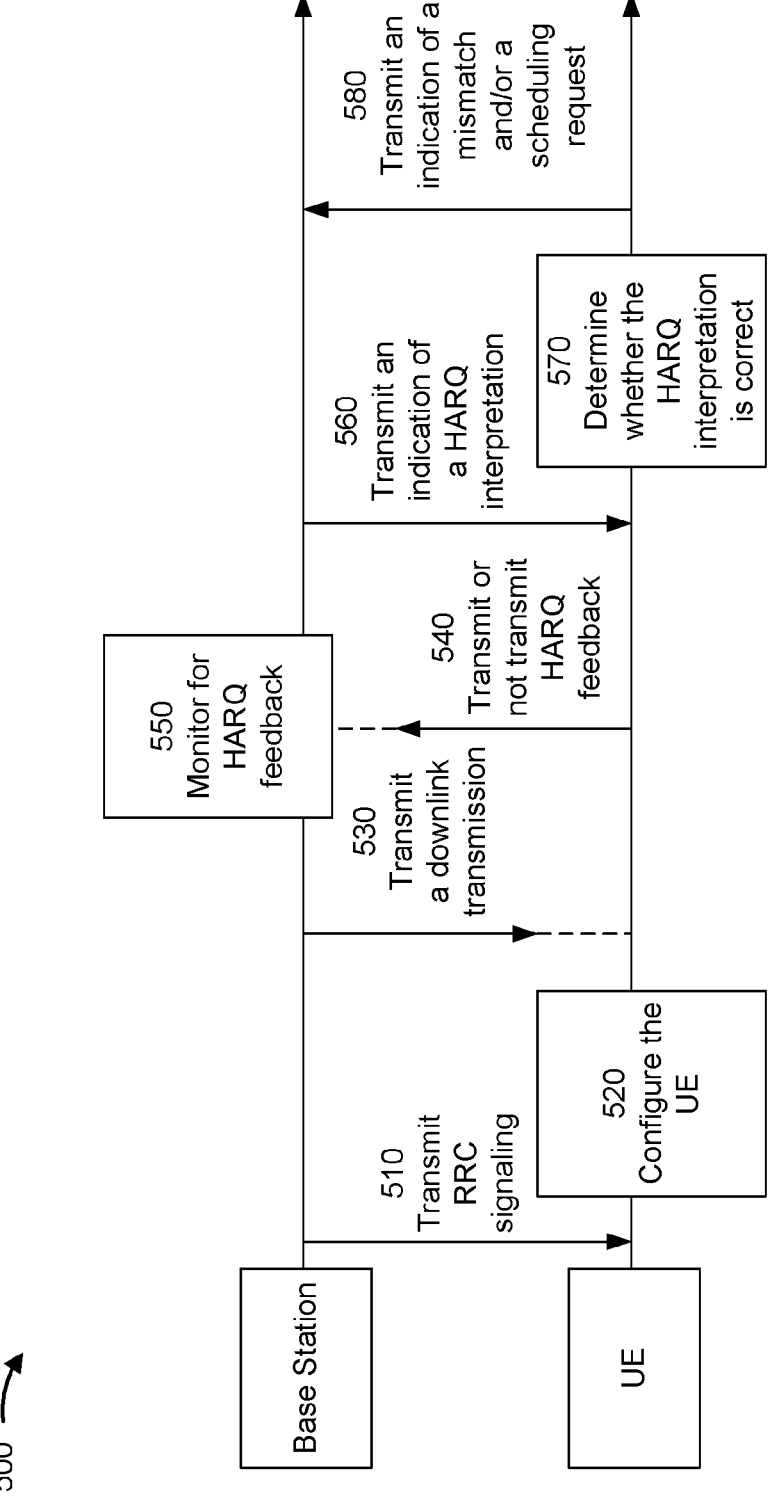
FIG. 5 is a diagram illustrating an example of HARQ feedback verification, in accordance with the present disclosure.

FIG. 5 is a diagram illustrating an example 500 of HARQ feedback verification, in accordance with the present disclosure. As shown, a UE (e.g., UE 120) and a base station (e.g., base station 110) may communicate using one or more of radio resource control (RRC) signaling, a downlink transmission, HARQ feedback, and/or the like. In some aspects, the base station and the UE may be part of a wireless network (e.g., the wireless network 100).

As shown in FIG. 5, and by reference number 510, the base station may transmit RRC signaling to the UE. The RRC signaling may include one or more indications of configurations for the UE. In some aspects, the RRC signaling may include one or more indications associated with scheduling downlink transmissions (e.g., semi-persistent scheduling).

In some aspects, the RRC signaling may include an indication of a HARQ feedback configuration. For example, the HARQ feedback configuration may indicate that a discontinuous transmission is to be used, where a UE is to transmit a NACK for unreceived downlink transmissions and transmit no HARQ feedback (e.g., no ACK) for received downlink transmissions. Additionally, or alternatively, the HARQ feedback configuration may indicate that the UE is to provide HARQ feedback including a soft NACK to indicate that a downlink transmission using a beam is not received and that the UE still received the downlink transmission (e.g., based at least in part on receiving the downlink transmission via another beam, reconstructing the downlink transmission using multiple unsuccessful attempts to receive the downlink transmission, and/or the like).

As shown by reference number 520, the UE may configure the UE based at least in part on the RRC signaling. In some aspects, the UE may be configured to receive multiple downlink transmissions during multiple downlink transmission occasions scheduled via the RRC (e.g., based at least in part on semi-persistent scheduling). In some aspects, the UE may be configured to use discontinuous transmissions for HARQ feedback, to use a soft NACK when a downlink transmission using a beam is not received and the UE still received the downlink transmission (e.g., and does not request a retransmission), and/or the like.

As shown by reference number 530, the base station may transmit a downlink transmission. The UE may monitor for the downlink transmission based at least in part on a schedule received from the base station (e.g., based at least in part on the RRC signaling, a downlink control information message, and/or the like).

As shown by reference number 540, the UE may transmit or not transmit HARQ feedback based at least in part on monitoring for the downlink transmission. In some aspects, the UE may transmit HARQ feedback (e.g., an ACK, a NACK, a soft NACK, and/or the like) to indicate whether the UE received the downlink transmission. In some aspects, the UE may not transmit HARQ feedback based at least in part on the UE being configured to use discontinuous transmissions for HARQ feedback and the UE receiving the downlink transmission. In some aspects, the UE may store the HARQ feedback to compare with an indication of an interpretation of the HARQ feedback by the base station.

In some aspects, the HARQ feedback may include feedback for multiple downlink transmissions. For example, the HARQ feedback may include feedback for downlink transmissions via multiple component carriers, downlink transmissions over time, and/or the like.

As shown by reference number 540, the base station may monitor for the HARQ feedback during a HARQ feedback occasion. The base station may interpret the HARQ feedback based at least in part on whether the base station receives the HARQ feedback and/or an indication within the HARQ feedback. When the UE is configured for discontinuous transmission of HARQ feedback, the base station may interpret the HARQ occasion as an ACK based at least in part on not receiving a NACK or a soft NACK during the HARQ feedback occasion.

As shown by reference number 560, the base station may transmit an indication of the interpretation of the HARQ feedback. In some In some aspects, the base station may transmit the indication via a physical layer indication. For example, the physical layer indication may be within DCI (downlink control information). In some aspects, the physical layer indication may be included in a medium access control control element (MAC CE), a radio link control (RLC) layer indication, and/or the like.

In some aspects, the physical layer indication may be piggybacked with a subsequent downlink transmission. For example, the base station may transmit the physical layer indication at the beginning or end of a subsequent DCI message (e.g., a DCI message that schedules another downlink transmission). In some aspects, the subsequent downlink transmission may be during a subsequent cycle (e.g., a subsequent transmission cycle).

As shown by reference number 570, the UE may receive the indication of the interpretation of the HARQ feedback by the base station and determine whether the interpretation of the HARQ feedback by the base station is correct. In some aspects, the UE may compare stored HARQ feedback and the indication of the interpretation of the HARQ feedback by the base station to determine whether the interpretation of the HARQ feedback by the base station is correct. Based at least in part on determining that the interpretation of the HARQ feedback by the base station is correct, the UE may take no action, may delete stored HARQ feedback associated with the downlink transmission, and/or the like.

If the UE has transmitted a NACK in a previous cycle and an expected indication from the base station in a current cycle has not been received, the UE may perform one or more processes associated a beam failure recovery procedure. In some aspects, the UE may perform the one or more processes associated a beam failure recovery procedure based at least in part on a failure to receive a threshold number of expected indications from the base station (e.g., a number of consecutive expected indications, a number of expected indications during a period of time, and/or the like).

In some aspects, the UE apply beam sweeping using a predetermined order (e.g., agreed upon between the base station and the UE), of TCI states. The predefined order may correspond to an order of strongest TCI states as reported to the base station via a most recent measurement report. In some aspects, the described UE behavior may be agreed upon based at least in part on RRC signaling (e.g., during a RRC connection establishment). In some aspects, the base station may be able to receive a sweep of beams in the predefined order (e.g., based at least in part on strengths of TCI states reported by the UE).

If the UE determines that the interpretation of the HARQ feedback by the base station is incorrect, the UE may perform one or more actions. In some aspects, the UE may store an indication that a mismatch of HARQ feedback has occurred. In some aspects, the UE may count a number of mismatches of HARQ feedback (e.g., a number of consecutive mismatches, a number of mismatches within a period of time, and/or the like) to determine whether the UE should take further action.

In some aspects, the UE may determine that the interpretation of the HARQ feedback by the base station is incorrect and a number of interpretations of previous consecutive HARQ feedbacks were incorrect. Based at least in part on determining that a total number of consecutive incorrect HARQ feedbacks (e.g., including the current incorrect interpretation of the HARQ feedback) satisfy a threshold, the UE may transmit a scheduling request to request a new TCI state. In some aspects, the UE threshold may be 1 so the UE may transmit the scheduling request based at least in part on the mismatch of the HARQ feedback for the downlink transmission without consideration of whether previous mismatches of HARQ feedback occurred.

As shown by reference number 580, the UE may transmit an indication of a mismatch and/or a scheduling request. The indication of the mismatch may be to inform the base station of the mismatch of the HARQ feedback and/or may trigger a response from the base station (e.g., transmitting an indication of a new TCI state, initiation of a beam selection process, and/or the like).

In some aspects, the UE may transmit the scheduling request to request a new TCI state via a PUCCH, a random access channel (RACH), and/or the like. In some aspects, the UE may transmit the scheduling request via a current beam associated with the HARQ feedback, via a current beam not associated with the HARQ feedback, or via a new beam. In some aspects, the UE may transmit the scheduling request via the current beam associated with the HARQ feedback if the UE correctly received the downlink transmission via the current beam associated with the HARQ feedback. In some aspects, the UE may transmit the scheduling request via the current beam not associated with the HARQ feedback if the UE correctly received the downlink transmission via the current beam not associated with the HARQ feedback. In some aspects, the UE may transmit the scheduling request via one or more current beams if the UE did not receive the downlink transmission via any current beams individually and is transmitting a soft NACK as the HARQ feedback. In some aspects, the UE may transmit the scheduling request via a new beam if the UE did not receive the downlink transmission via any current beams and the UE is transmitting a NACK or a soft NACK. For example, the UE may transmit the scheduling request as a RACH message (e.g., Message 3 or Message A) based at least in part on the UE not receiving the downlink transmission via any current beams.

In this way, the UE may be aware of a mismatch of HARQ feedback and may perform one or more actions to attempt to avoid additional mismatches of HARQ feedback. This may conserve computing, communication, and/or network resources that may otherwise have been used for the base station to continue transmitting multiple downlink transmissions that are not being received by the UE, as shown in FIGS. 3 and 4, to detect that the multiple downlink transmissions are not being received, and to recover from the UE not receiving the multiple transmissions.

As indicated above, FIG. 5 is provided as an example. Other examples may differ from what is described with respect to FIG. 5.

Figure 6:
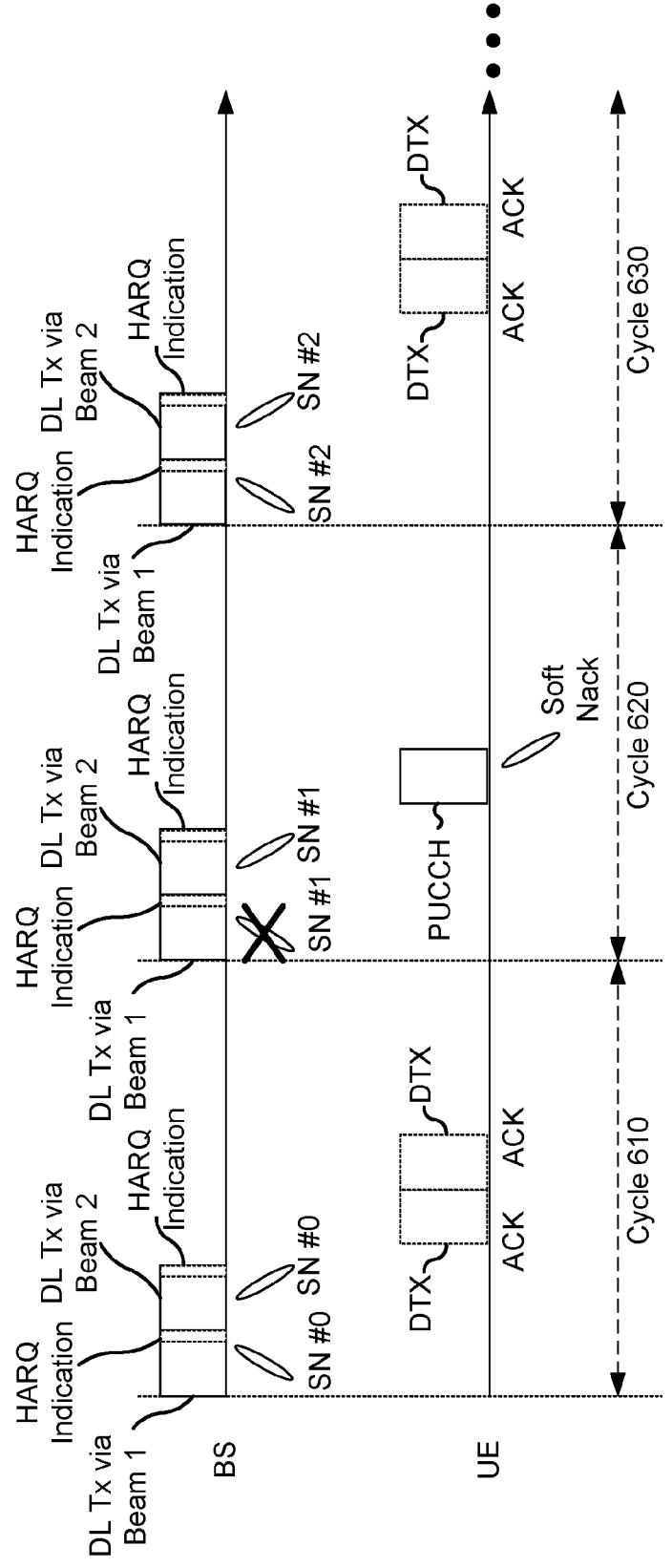
FIG. 6 is a diagram illustrating an example of HARQ feedback verification, in accordance with the present disclosure.

FIG. 6 is a diagram illustrating an example 600 of HARQ feedback verification, in accordance with the present disclosure. As shown, a UE (e.g., UE 120) and a base station (e.g., base station 110) may communicate using one or more of RRC signaling, a downlink transmission, HARQ feedback, and/or the like. In some aspects, the base station and the UE may be part of a wireless network (e.g., the wireless network 100).

As shown in FIG. 6, and in cycle 610, the base station may transmit a downlink transmission, having a sequence number 0, via a beam 1 and a beam 2. The base station may transmit the downlink transmission using a PDSCH. The PDSCH may be scheduled using semi-persistent scheduling. The base station may also transmit, with the downlink transmission and/or piggybacked with the downlink transmission, a HARQ indication that indicates an interpretation of HARQ feedback associated with a previous downlink transmission (not shown).

As further shown in cycle 610, the UE may receive the downlink transmission having the sequence number 0 and may determine to transmit an ACK or to not transmit HARQ feedback (e.g., based at least in part on the UE being configured for discontinuous transmission (DTX) of HARQ feedback). The base station may interpret the ACK, or not receiving any HARQ feedback in the case of discontinuous transmission, as an indication that the UE received the downlink transmission having the sequence number 0 from at least one of the beam 1 or the beam 2, or from both of the beam 1 and the beam 2 (e.g., if the UE is configured to use a soft NACK). In some aspects, the downlink transmission having the sequence number 0 may expire at the end of cycle 610.

As shown in cycle 620, the base station may transmit a downlink transmission, having a sequence number 1, via the beam 1 and the beam 2. The base station may also transmit a HARQ indication that indicates an interpretation of HARQ feedback associated with the downlink transmission having the sequence number 0 as an ACK. The beam 1 may be blocked and the UE may receive the downlink transmission having the sequence number 1 via the beam 2.

The UE may transmit a soft NACK (e.g., using a PUCCH), via the beam 1 and/or the beam 2, to indicate that the UE did not receive the downlink transmission having the sequence number 1. In some aspects, the UE may transmit the soft NACK via the beam 2 based at least in part on the UE receiving the downlink transmission having the sequence number 1 via the beam 2 and failing to receive the downlink transmission having the sequence number 1 via the beam 1.

The base station may receive the soft NACK from the UE and interpret the soft NACK as an indication that the downlink transmission having the sequence number 1 has been received and that the beam 1 was not effective to transmit the downlink transmission having the sequence number 1 (e.g., based at least in part on blocking, interference, and/or the like). In some aspects, the downlink transmission having the sequence number 1 may expire at the end of cycle 620.

As shown in cycle 630, the base station may transmit a downlink transmission, having a sequence number 2, via the beam 1 and the beam 2. The base station may also transmit a HARQ indication that indicates an interpretation of HARQ feedback associated with the downlink transmission having the sequence number 1 as a soft NACK. The UE may receive the downlink transmission having the sequence number 2 via both of the beam 1 and the beam 2.

As further shown in cycle 630, the UE may receive the downlink transmission having the sequence number 2 and may determine to transmit an ACK or to not transmit HARQ feedback (e.g., based at least in part on the UE being configured for discontinuous transmission of HARQ feedback). The base station may interpret the ACK, or not receiving any HARQ feedback in the case of discontinuous transmission, as an indication that the UE received the downlink transmission having the sequence number 2 from at least one of the beam 1 or the beam 2, or from both of the beam 1 and the beam 2 (e.g., if the UE is configured to use a soft NACK). In some aspects, the downlink transmission having the sequence number 2 may expire at the end of cycle 630.

As indicated above, FIG. 6 is provided as an example. Other examples may differ from what is described with respect to FIG. 6.

Figure 7:
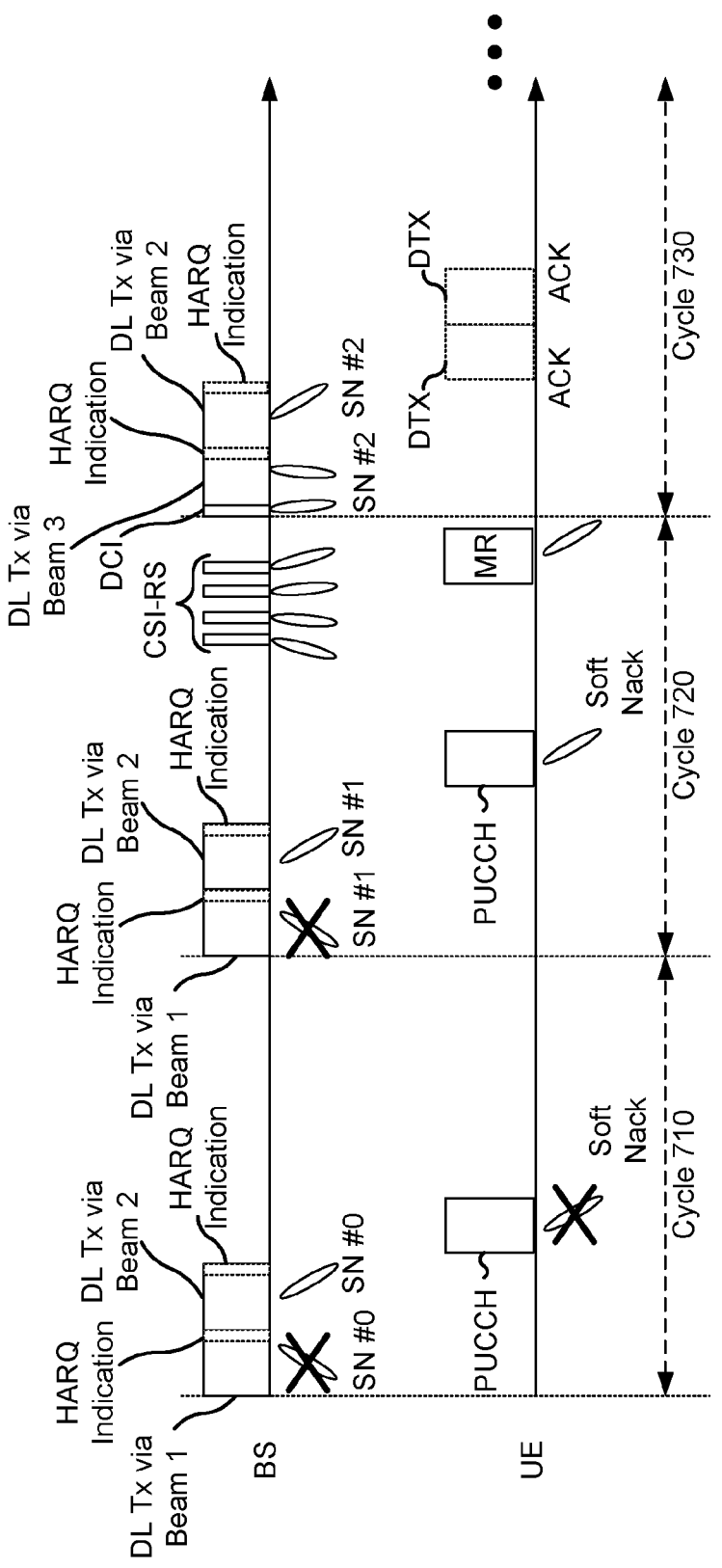
FIG. 7 is a diagram illustrating an example of HARQ feedback verification, in accordance with the present disclosure.

FIG. 7 is a diagram illustrating an example 700 of HARQ feedback verification, in accordance with the present disclosure. As shown, a UE (e.g., UE 120) and a base station (e.g., base station 110) may communicate using one or more of RRC signaling, a downlink transmission, HARQ feedback, and/or the like. In some aspects, the base station and the UE may be part of a wireless network (e.g., the wireless network 100).

As shown in FIG. 7, and in cycle 710, the base station may transmit a downlink transmission, having a sequence number 0, via a beam 1 and a beam 2. The base station may transmit the downlink transmission using a PDSCH. The PDSCH may be scheduled using semi-persistent scheduling. The base station may also transmit, with the downlink transmission and/or piggybacked with the downlink transmission, a HARQ indication that indicates an interpretation of HARQ feedback associated with a previous downlink transmission (not shown). The beam 1 may be blocked and the UE may receive the downlink transmission having the sequence number 0 via the beam 2.

The UE may transmit a soft NACK (e.g., using a PUCCH), via the beam 1 and/or the beam 2, to indicate that the UE did not receive the downlink transmission having the sequence number 0. In some aspects, the UE may transmit the soft NACK via the beam 2 based at least in part on the UE receiving the downlink transmission having the sequence number 0 via the beam 2 and failing to receive the downlink transmission having the sequence number 0 via the beam 1 The beam 2 may be blocked and the base station may not receive any HARQ feedback during a HARQ feedback occasion associated with the downlink transmission having the sequence number 0. Based at least in part on the UE being configured to use discontinuous transmissions for HARQ feedback, the base station may interpret the HARQ feedback as an ACK for the downlink transmission having the sequence number 0.

As shown in cycle 720, the base station may transmit a downlink transmission, having a sequence number 1, via the beam 1 and the beam 2. The base station may also transmit a HARQ indication that indicates an interpretation of HARQ feedback associated with the downlink transmission having the sequence number 0 as an ACK. The beam 1 may be blocked and the UE may receive the downlink transmission having the sequence number 1 via the beam 2.

The UE may transmit a soft NACK (e.g., using a PUCCH), via the beam 1 and/or the beam 2, to indicate that the UE did not receive the downlink transmission having the sequence number 1 via beam 1. In some aspects, the UE may transmit the soft NACK via the beam 2 based at least in part on the UE receiving the downlink transmission having the sequence number 1 via the beam 2 and failing to receive the downlink transmission having the sequence number 1 via the beam 1.

The UE may determine, based at least in part on the indication that the base station interpreted the HARQ feedback associated with the downlink transmission having the sequence number 0 as an ACK, that a HARQ feedback mismatch has occurred. In some aspects, the UE may transmit HARQ feedback that indicates that the interpretation of the HARQ feedback for the downlink transmission having the sequence number 0 is incorrect. In some aspects, the UE may transmit a scheduling request to request a new TCI state based at least in part on determining that HARQ feedback mismatch has occurred, that a total number of consecutive incorrect HARQ feedbacks (e.g., including the current incorrect interpretation of the HARQ feedback) satisfy a threshold, and/or the like.

The base station may receive the scheduling request and begin a beam sweeping procedure. For example, the base station may transmit a channel state information (CSI) reference signal (RS) via multiple beams. In some aspects, the multiple beams may include the beam 1, the beam 2, and one or more new beams. The UE may measure the CSI-RSs and generate a measurement report (MR). The measurement report may indicate a ranking of TCI state identifications based at least in part on CSI-RS measurements (e.g., RSRP, RSSI, RSRQ, CQI, and/or the like).

As shown in cycle 730, the base station may transmit DCI to activate one or more TCI states. In some aspects, the DCI may activate a number (e.g., 2) of highest ranked TCI state identifications for transmitting a downlink transmission having a sequence number 2. In some aspects, the base station may transmit the DCI using a beam associated with a highest ranked TCI state identification. In some aspects, the base station may transmit the DCI using beam 2 based at least in part on the soft NACK indicating that the UE received the downlink transmission having the sequence number 1 via the beam 2.

As also shown in cycle 730, the base station may transmit a downlink transmission, having a sequence number 2, via the beam 2 and a beam 3 (e.g., a new beam). The base station may also transmit a HARQ indication that indicates an interpretation of HARQ feedback associated with the downlink transmission having the sequence number 1 as a soft NACK. The UE may receive the downlink transmission having the sequence number 2 via both of the beam 2 and the beam 3.

As further shown in cycle 730, the UE may receive the downlink transmission having the sequence number 2 and may determine to transmit an ACK or to not transmit HARQ feedback (e.g., based at least in part on the UE being configured for discontinuous transmission of HARQ feedback). The base station may interpret the ACK, or not receiving any HARQ feedback, as an indication that the UE received the downlink transmission having the sequence number 2 from at least one of the beam 2 or the beam 3, or from both of the beam 2 and the beam 3 (e.g., if the UE is configured to use a soft NACK). In some aspects, the downlink transmission having the sequence number 2 may expire at the end of cycle 730.

As indicated above, FIG. 7 is provided as an example. Other examples may differ from what is described with respect to FIG. 7.

Figure 8:
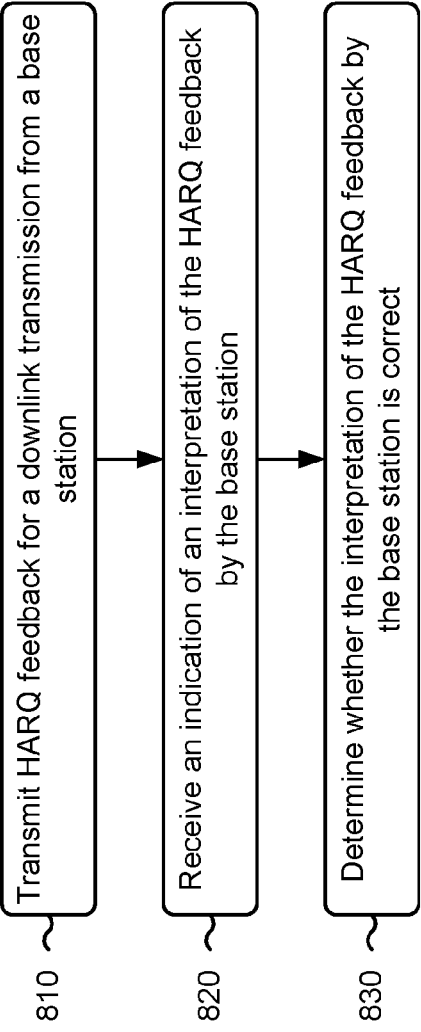
FIG. 8 is a diagram illustrating an example process performed, for example, by a user equipment, in accordance with the present disclosure.

FIG. 8 is a diagram illustrating an example process 800 performed, for example, by a UE, in accordance with the present disclosure. Example process 800 is an example where the UE (e.g., UE 120 and/or the like) performs operations associated with hybrid automatic repeat request feedback verification.

As shown in FIG. 8, in some aspects, process 800 may include transmitting HARQ feedback for a downlink transmission from a base station (block 810). For example, the UE (e.g., using controller/processor 280, transmit processor 264, TX MIMO processor 266, MOD 254, antenna 252, and/or the like) may transmit HARQ feedback for a downlink transmission from a base station, as described above.

As further shown in FIG. 8, in some aspects, process 800 may include receiving an indication of an interpretation of the HARQ feedback by the base station (block 820). For example, the UE (e.g., using antenna 252, DEMOD 254, MIMO detector 256, receive processor 258, controller/processor 280, and/or the like) may receive an indication of an interpretation of the HARQ feedback by the base station, as described above.

As further shown in FIG. 8, in some aspects, process 800 may include determining whether the interpretation of the HARQ feedback by the base station is correct (block 830). For example, the UE (e.g., using controller/processor 280 and/or the like) may determine whether the interpretation of the HARQ feedback by the base station is correct, as described above.

Process 800 may include additional aspects, such as any single aspect or any combination of aspects described below and/or in connection with one or more other processes described elsewhere herein.

In a first aspect, process 800 includes determining that the interpretation of the HARQ feedback by the base station is incorrect, and transmitting a scheduling request to request a new TCI state.

In a second aspect, alone or in combination with the first aspect, transmitting the scheduling request to request the new TCI state includes transmitting the scheduling request via a PUCCH, or transmitting the scheduling request via a RACH.

In a third aspect, alone or in combination with one or more of the first and second aspects, transmitting the scheduling request to request the new TCI state includes transmitting the scheduling request to request the new TCI state via a current beam associated with the HARQ feedback, transmitting the scheduling request to request the new TCI state via a current beam not associated with the HARQ feedback, or transmitting the scheduling request to request the new TCI state via a new beam.

In a fourth aspect, alone or in combination with one or more of the first through third aspects, process 800 includes determining that the interpretation of the HARQ feedback by the base station is incorrect, and transmitting, via a subsequent HARQ feedback, an indication of a mismatch between the HARQ feedback and the interpretation of the HARQ feedback by the base station.

In a fifth aspect, alone or in combination with one or more of the first through fourth aspects, process 800 includes determining that the interpretation of the HARQ feedback by the base station is incorrect and a number of interpretations of previous consecutive HARQ feedbacks were incorrect, determining that a total number of the HARQ feedback and the number of previous consecutive HARQ feedbacks satisfy a threshold, and transmitting a scheduling request to request a new TCI state.

In a sixth aspect, alone or in combination with one or more of the first through fifth aspects, transmitting the scheduling request to request the new TCI state includes transmitting the scheduling request via a PUCCH, or transmitting the scheduling request via a RACH.

In a seventh aspect, alone or in combination with one or more of the first through sixth aspects, transmitting the scheduling request to request the new TCI state comprises: transmitting the scheduling request to request the new TCI state via a current beam associated with the HARQ feedback, transmitting the scheduling request to request the new TCI state via a current beam not associated with the HARQ feedback, or transmitting the scheduling request to request the new TCI state via a new beam.

In an eighth aspect, alone or in combination with one or more of the first through seventh aspects, process 800 includes, after transmitting the HARQ feedback, storing the HARQ feedback, and determining whether the interpretation of the HARQ feedback by the base station is correct includes comparing the HARQ feedback that is stored and the indication of the interpretation of the HARQ feedback by the base station.

In a ninth aspect, alone or in combination with one or more of the first through eighth aspects, the base station is configured to interpret a HARQ feedback occasion without receiving a HARQ feedback as an acknowledgement, or the base station is configured to interpret a HARQ feedback occasion without receiving a HARQ feedback as a negative acknowledgement. In some aspects, the UE is configured for discontinuous transmission for HARQ feedback.

In a tenth aspect, alone or in combination with one or more of the first through ninth aspects, the UE is configured to transmit a soft NACK for HARQ feedback based at least in part on the UE receiving an associated downlink transmission via multiple beams and one or more beams of the multiple beams fail, and the soft negative acknowledgment indicates that the one or more beams of the multiple beams has failed.

In an eleventh aspect, alone or in combination with one or more of the first through tenth aspects, receiving the indication of the interpretation of the HARQ feedback by the base station includes receiving the indication of the interpretation of the HARQ feedback by the base station via a physical layer indication.

In a twelfth aspect, alone or in combination with one or more of the first through eleventh aspects, the physical layer indication is within DCI that is piggybacked with a subsequent downlink transmission.

In a thirteenth aspect, alone or in combination with one or more of the first through twelfth aspects, the subsequent downlink transmission is a downlink transmission during a subsequent cycle.

In a fourteenth aspect, alone or in combination with one or more of the first through thirteenth aspects, the physical layer indication is included in a MAC CE.

In a fifteenth aspect, alone or in combination with one or more of the first through fourteenth aspects, the physical layer indication is included in an RLC layer.

In a sixteenth aspect, alone or in combination with one or more of the first through fifteenth aspects, the HARQ feedback comprises feedback for multiple downlink transmissions.

In a seventeenth aspect, alone or in combination with one or more of the first through sixteenth aspects, the multiple downlink transmissions are associated with multiple component carriers.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
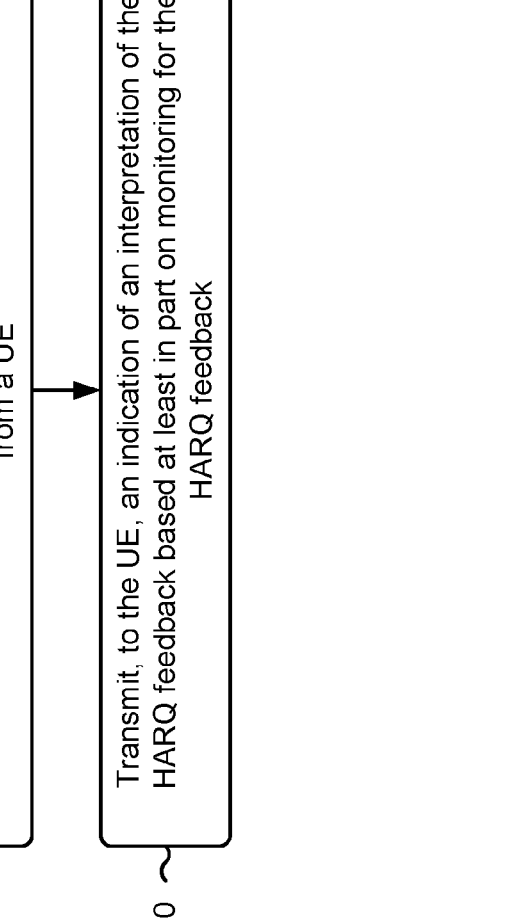
FIG. 9 is a diagram illustrating an example process performed, for example, by a base station, in accordance with the present disclosure.

FIG. 9 is a diagram illustrating an example process 900 performed, for example, by a base station, in accordance with the present disclosure. Example process 900 is an example where the base station (e.g., base station base station 110 and/or the like) performs operations associated with HARQ feedback verification.

As shown in FIG. 9, in some aspects, process 900 may include monitoring, during a HARQ feedback occasion, for HARQ feedback from a UE (block 910). For example, the base station (e.g., using antenna 234, DEMOD 232, MIMO detector 236, receive processor 238, controller/processor 240, and/or the like) may monitor, during a HARQ feedback occasion, for HARQ feedback from a UE, as described above.

As further shown in FIG. 9, in some aspects, process 900 may include transmitting, to the UE, an indication of an interpretation of the HARQ feedback based at least in part on monitoring for the HARQ feedback (block 920). For example, the base station (e.g., using controller/processor 240, transmit processor 220, TX MIMO processor 230, MOD 232, antenna 234, and/or the like) may transmit, to the UE, an indication of an interpretation of the HARQ feedback based at least in part on monitoring for the HARQ feedback, as described above.

Process 900 may include additional aspects, such as any single aspect or any combination of aspects described below and/or in connection with one or more other processes described elsewhere herein.

In a first aspect, process 900 includes determining, during the HARQ feedback occasion, that no HARQ feedback is received, and interpreting the determination as an ACK.

In a second aspect, alone or in combination with the first aspect, process 900 includes receiving, from the UE, a scheduling request to request a new TCI state based at least in part on the UE determining that the interpretation of the HARQ feedback is incorrect.

In a third aspect, alone or in combination with one or more of the first and second aspects, receiving the scheduling request to request the new TCI state includes receiving the scheduling request via a PUCCH, or receiving the scheduling request via a RACH.

In a fourth aspect, alone or in combination with one or more of the first through third aspects, receiving the scheduling request to request the new TCI state includes receiving the scheduling request to request the new TCI state via a current beam associated with a downlink transmission that is associated with the HARQ feedback, receiving the scheduling request to request the new TCI state via a current beam not associated with the downlink transmission that is associated with the HARQ feedback, or receiving the scheduling request to request the new TCI state via a new beam.

In a fifth aspect, alone or in combination with one or more of the first through fourth aspects, process 900 includes receiving, via a subsequent HARQ feedback occasion, an indication of a mismatch between the interpretation of the HARQ feedback and the HARQ feedback transmitted by the UE.

In a sixth aspect, alone or in combination with one or more of the first through fifth aspects, transmitting the indication of the interpretation of the HARQ feedback includes transmitting the indication of the interpretation of the HARQ feedback via a physical layer indication.

In a seventh aspect, alone or in combination with one or more of the first through sixth aspects, the physical layer indication is within DCI that is piggybacked with a subsequent downlink transmission.

In an eighth aspect, alone or in combination with one or more of the first through seventh aspects, the subsequent downlink transmission is a downlink transmission during a subsequent cycle.

In a ninth aspect, alone or in combination with one or more of the first through eighth aspects, the physical layer indication is included in a MAC CE.

In a tenth aspect, alone or in combination with one or more of the first through ninth aspects, the physical layer indication is included in an RLC layer.

In an eleventh aspect, alone or in combination with one or more of the first through tenth aspects, the HARQ feedback comprises feedback for multiple downlink transmissions.

In a twelfth aspect, alone or in combination with one or more of the first through eleventh aspects, the multiple downlink transmissions are associated with multiple component carriers.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A method of wireless communication performed by a user equipment (UE), comprising: transmitting hybrid automatic repeat request (HARQ) feedback for a downlink transmission from a base station; receiving an indication of an interpretation of the HARQ feedback by the base station; and determining whether the interpretation of the HARQ feedback by the base station is correct.

Aspect 2: The method of Aspect 1, further comprising: determining that the interpretation of the HARQ feedback by the base station is incorrect; and transmitting a scheduling request to request a new transmission configuration indicator state.

Aspect 3: The method of Aspect 2, wherein transmitting the scheduling request to request the new transmission configuration indicator state comprises: transmitting the scheduling request via a physical uplink control channel, or transmitting the scheduling request via a random access channel.

Aspect 4: The method of any of Aspects 2-3, wherein transmitting the scheduling request to request the new transmission configuration indicator state comprises: transmitting the scheduling request to request the new transmission configuration indicator state via a current beam associated with the HARQ feedback, transmitting the scheduling request to request the new transmission configuration indicator state via a current beam not associated with the HARQ feedback, or transmitting the scheduling request to request the new transmission configuration indicator state via a new beam.

Aspect 5: The method of any of Aspects 1-4, further comprising: determining that the interpretation of the HARQ feedback by the base station is incorrect; and transmitting, via a subsequent HARQ feedback, an indication of a mismatch between the HARQ feedback and the interpretation of the HARQ feedback by the base station.

Aspect 6: The method of any of Aspects 1-5, further comprising: determining that the interpretation of the HARQ feedback by the base station is incorrect and a number of interpretations of previous consecutive HARQ feedbacks were incorrect; determining that a total number of the HARQ feedback and the number of previous consecutive HARQ feedbacks satisfy a threshold; and transmitting a scheduling request to request a new transmission configuration indicator state.

Aspect 7: The method of Aspect 6, wherein transmitting the scheduling request to request the new transmission configuration indicator state comprises: transmitting the scheduling request via a physical uplink control channel, or transmitting the scheduling request via a random access channel.

Aspect 8: The method of any of Aspects 6-7, wherein transmitting the scheduling request to request the new transmission configuration indicator state comprises: transmitting the scheduling request to request the new transmission configuration indicator state via a current beam associated with the HARQ feedback, transmitting the scheduling request to request the new transmission configuration indicator state via a current beam not associated with the HARQ feedback, or transmitting the scheduling request to request the new transmission configuration indicator state via a new beam.

Aspect 9: The method of any of Aspects 6-8, further comprising, after transmitting the HARQ feedback, storing the HARQ feedback, wherein determining whether the interpretation of the HARQ feedback by the base station is correct comprises: comparing the HARQ feedback that is stored and the indication of the interpretation of the HARQ feedback by the base station.

Aspect 10: The method of any of Aspects 1-9, wherein the base station is configured to interpret a HARQ feedback occasion without receiving a HARQ feedback as an acknowledgement, or wherein the base station is configured to interpret a HARQ feedback occasion without receiving a HARQ feedback as a negative acknowledgement.

Aspect 11: The method of any of Aspects 1-10, wherein the UE is configured to transmit a soft negative acknowledgement for HARQ feedback based at least in part on the UE receiving an associated downlink transmission via multiple beams and one or more beams of the multiple beams fail, and wherein the soft negative acknowledgment indicates that the one or more beams of the multiple beams has failed.

Aspect 12: The method of any of Aspects 1-11, wherein receiving the indication of the interpretation of the HARQ feedback by the base station comprises: receiving the indication of the interpretation of the HARQ feedback by the base station via a physical layer indication.

Aspect 13: The method of Aspect 12, wherein the physical layer indication is within downlink control information that is piggybacked with a subsequent downlink transmission.

Aspect 14: The method of any of Aspects 12-13, wherein the subsequent downlink transmission is a downlink transmission during a subsequent cycle.

Aspect 15: The method of any of Aspects 12-14, wherein the physical layer indication is included in a medium access control control element.

Aspect 16: The method of any of Aspects 12-14, wherein the physical layer indication is included in a radio link control layer.

Aspect 17: The method of any of Aspects 1-16, wherein the HARQ feedback comprises feedback for multiple downlink transmissions.

Aspect 18: The method of Aspect 17, wherein the multiple downlink transmissions are associated with multiple component carriers.

Aspect 19: A method of wireless communication performed by a base station, comprising: monitoring, during a hybrid automatic repeat request (HARQ) feedback occasion, for HARQ feedback from a user equipment (UE); and transmitting, to the UE, an indication of an interpretation of the HARQ feedback based at least in part on monitoring for the HARQ feedback.

Aspect 20: The method of Aspect 19, further comprising: determining, during the HARQ feedback occasion, that no HARQ feedback is received; and interpreting the determination as an acknowledgement.

Aspect 21: The method of any of Aspects 19-20, further comprising: receiving, from the UE, a scheduling request to request a new transmission configuration indicator state based at least in part on the UE determining that the interpretation of the HARQ feedback is incorrect.

Aspect 22: The method of Aspect 21, wherein receiving the scheduling request to request the new transmission configuration indicator state comprises: receiving the scheduling request via a physical uplink control channel, or receiving the scheduling request via a random access channel.

Aspect 23: The method of any of Aspects 19-22, wherein receiving the scheduling request to request the new transmission configuration indicator state comprises: receiving the scheduling request to request the new transmission configuration indicator state via a current beam associated with a downlink transmission that is associated with the HARQ feedback, receiving the scheduling request to request the new transmission configuration indicator state via a current beam not associated with the downlink transmission that is associated with the HARQ feedback, or receiving the scheduling request to request the new transmission configuration indicator state via a new beam.

Aspect 24: The method of any of Aspects 19-23, further comprising: receiving, via a subsequent HARQ feedback occasion, an indication of a mismatch between the interpretation of the HARQ feedback and the HARQ feedback transmitted by the UE.

Aspect 25: The method of any of Aspects 19-24, wherein transmitting the indication of the interpretation of the HARQ feedback comprises: transmitting the indication of the interpretation of the HARQ feedback via a physical layer indication.

Aspect 26: The method of Aspect 25, wherein the physical layer indication is within downlink control information that is piggybacked with a subsequent downlink transmission.

Aspect 27: The method of Aspect 26, wherein the subsequent downlink transmission is a downlink transmission during a subsequent cycle.

Aspect 28: The method of Aspect 26, wherein the physical layer indication is included in a medium access control control element.

Aspect 29: The method of any of Aspects 26-27, wherein the physical layer indication is included in a radio link control layer.

Aspect 30: The method of any of Aspects 19-29, wherein the HARQ feedback comprises feedback for multiple downlink transmissions.

Aspect 31: The method of Aspect 30, wherein the multiple downlink transmissions are associated with multiple component carriers.

Aspect 32: An apparatus for wireless communication at a device, comprising a processor; memory coupled with the processor; and instructions stored in the memory and executable by the processor to cause the apparatus to perform the method of one or more Aspects of Aspects 1-31.

Aspect 33: A device for wireless communication, comprising a memory and one or more processors coupled to the memory, the memory and the one or more processors configured to perform the method of one or more Aspects of Aspects 1-31.

Aspect 34: An apparatus for wireless communication, comprising at least one means for performing the method of one or more Aspects of Aspects 1-31.

Aspect 35: A non-transitory computer-readable medium storing code for wireless communication, the code comprising instructions executable by a processor to perform the method of one or more Aspects of Aspects 1-31.

Aspect 36: A non-transitory computer-readable medium storing a set of instructions for wireless communication, the set of instructions comprising one or more instructions that, when executed by one or more processors of a device, cause the device to perform the method of one or more Aspects of Aspects 1-31.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, operatively coupled to the memory, configured to:
      transmit, using one or more beams, a hybrid automatic repeat request (HARQ) feedback for a downlink transmission from a base station;
      receive an indication of an interpretation of the HARQ feedback by the base station;
      determine that the interpretation of the HARQ feedback by the base station is incorrect, and that interpretations corresponding to a number of previous consecutive HARQ feedbacks were incorrect, wherein the number is at least one;
      determine that the number of the previous consecutive HARQ feedbacks satisfies a threshold; and
      transmit, based at least in part on the determination that the threshold is satisfied, a scheduling request to request a new transmission configuration indicator (TCI) state to perform one or more of beam selection or beam switching.

2. The UE of claim 1, wherein the one or more processors, when transmitting the scheduling request to request the new TCI state, are configured to:
   transmit the scheduling request to request the new TCI state via a current beam of the one or more beams associated with the HARQ feedback,
   transmit the scheduling request to request the new TCI state via a current beam of the one or more beams not associated with the HARQ feedback, or
   transmit the scheduling request to request the new TCI state via a new beam of the one or more beams.

3. The UE of claim 1, wherein the one or more processors are further configured to store the HARQ feedback after transmitting the HARQ feedback,
   wherein the one or more processors, when determining that the interpretation of the HARQ feedback by the base station is not correct, are configured to:
      compare the HARQ feedback that is stored and the indication of the interpretation of the HARQ feedback by the base station.

4. The UE of claim 1, wherein the base station is configured to interpret a HARQ feedback occasion without receiving a HARQ feedback as an acknowledgement, or
   wherein the base station is configured to interpret a HARQ feedback occasion without receiving a HARQ feedback as a negative acknowledgement.

5. The UE of claim 1, wherein the UE is configured to transmit a soft negative acknowledgement for HARQ feedback based at least in part on the UE receiving an associated downlink transmission via the one or more beams and a subset of the one or more beams, and
   wherein the soft negative acknowledgement indicates that the subset of the one or more beams has failed.

6. The UE of claim 1, wherein the one or more processors, when receiving the indication of the interpretation of the HARQ feedback by the base station, are configured to:
   receive the indication of the interpretation of the HARQ feedback by the base station via a physical layer indication.

7. The UE of claim 6, wherein the physical layer indication is within downlink control information that is piggybacked with a subsequent downlink transmission.

8. The UE of claim 7, wherein the subsequent downlink transmission is a downlink transmission during a subsequent cycle.

9. The UE of claim 1, wherein the HARQ feedback comprises feedback for multiple downlink transmissions.

10. The UE of claim 9, wherein the multiple downlink transmissions are associated with multiple component carriers.

11. The UE of claim 1, wherein the one or more processors are further configured to:
   determine that the interpretation of the HARQ feedback by the base station is incorrect; and transmit, via a subsequent HARQ feedback, an indication of a mismatch between the HARQ feedback and the interpretation of the HARQ feedback by the base station.

12. A method of wireless communication performed by a user equipment (UE), comprising:

transmitting, using one or more beams, a hybrid automatic repeat request (HARQ) feedback for a downlink transmission from a base station;

receiving an indication of an interpretation of the HARQ feedback by the base station;

determining that the interpretation of the HARQ feedback by the base station is incorrect, and that interpretations corresponding to a number of previous consecutive HARQ feedbacks were incorrect, wherein the number is at least one;

determining that the number of the previous consecutive HARQ feedbacks satisfies a threshold; and transmitting, based at least in part on the determination that the threshold is satisfied, a scheduling request to request a new transmission configuration indicator (TCI) state to perform one or more of beam selection or beam switching.

13. The method of claim 12, wherein transmitting the scheduling request to request the new TCI state comprises:

transmitting the scheduling request to request the new TCI state via a current beam of the one or more beams associated with the HARQ feedback, transmitting the scheduling request to request the new TCI state via a current beam of the one or more beams not associated with the HARQ feedback, or transmitting the scheduling request to request the new TCI state via a new beam of the one or more beams.

14. The method of claim 12, further comprising, after transmitting the HARQ feedback, storing the HARQ feedback, wherein determining that the interpretation of the HARQ feedback by the base station is not correct comprises:

comparing the HARQ feedback that is stored and the indication of the interpretation of the HARQ feedback by the base station.

15. The method of claim 12, wherein the base station is configured to interpret a HARQ feedback occasion without receiving a HARQ feedback as an acknowledgement, or wherein the base station is configured to interpret a HARQ feedback occasion without receiving a HARQ feedback as a negative acknowledgement.

16. The method of claim 12, wherein the UE is configured to transmit a soft negative acknowledgement for HARQ feedback based at least in part on the UE receiving an associated downlink transmission via the one or more beams and a subset of the one or more beams, and wherein the soft negative acknowledgement indicates that the subset of the one or more beams has failed.

17. The method of claim 12, wherein receiving the indication of the interpretation of the HARQ feedback by the base station comprises:

receiving the indication of the interpretation of the HARQ feedback by the base station via a physical layer indication.

18. The method of claim 17, wherein the physical layer indication is within downlink control information that is piggybacked with a subsequent downlink transmission.

19. The method of claim 18, wherein the subsequent downlink transmission is a downlink transmission during a subsequent cycle.

20. The method of claim 12, wherein the HARQ feedback comprises feedback for multiple downlink transmissions.

21. The method of claim 20, wherein the multiple downlink transmissions are associated with multiple component carriers.

22. The method of claim 12, further comprising: determining that the interpretation of the HARQ feedback by the base station is incorrect; and transmitting, via a subsequent HARQ feedback, an indication of a mismatch between the HARQ feedback and the interpretation of the HARQ feedback by the base station.

23. A non-transitory computer-readable medium storing a set of instructions for wireless communication, the set of instructions comprising:

one or more instructions that, when executed by one or more processors of a user equipment (UE), cause the UE to:

transmit, using one or more beams, a hybrid automatic repeat request (HARQ) feedback for a downlink transmission from a base station;

receive an indication of an interpretation of the HARQ feedback by the base station;

determine that the interpretation of the HARQ feedback by the base station is incorrect, and that interpretations corresponding to a number of previous consecutive HARQ feedbacks were incorrect, wherein the number is at least one;

determine that the number of the previous consecutive HARQ feedbacks satisfies a threshold; and transmit, based at least in part on the determination that the threshold is satisfied, a scheduling request to request a new transmission configuration indicator (TCI) state to perform one or more of beam selection or beam switching.

24. The non-transitory computer-readable medium of claim 23, wherein the one or more instructions further cause the UE to, after transmitting the HARQ feedback, store the HARQ feedback, wherein the one or more instructions, that cause the UE to determine that the interpretation of the HARQ feedback by the base station is not correct, cause the UE to:

compare the HARQ feedback that is stored and the indication of the interpretation of the HARQ feedback by the base station.

25. The non-transitory computer-readable medium of claim 23, wherein the one or more instructions, that cause the UE to transmit the scheduling request to request the new TCI state, cause the UE to:

transmit the scheduling request to request the new TCI state via a current beam of the one or more beams associated with the HARQ feedback, transmit the scheduling request to request the new TCI state via a current beam of the one or more beams not associated with the HARQ feedback, or transmit the scheduling request to request the new TCI state via a new beam of the one or more beams.

26. The non-transitory computer-readable medium of claim 23, wherein the one or more instructions further cause the UE to interpret a HARQ feedback occasion without receiving a HARQ feedback as an acknowledgement, or wherein the one or more instructions further cause the UE to interpret a HARQ feedback occasion without receiving a HARQ feedback as a negative acknowledgement.

27. The non-transitory computer-readable medium of claim 23, wherein the one or more instructions further cause the UE to transmit a soft negative acknowledgement for HARQ feedback based at least in part on the UE receiving an associated downlink transmission via the one or more beams and a subset of the one or more beams, and wherein the soft negative acknowledgement indicates that the subset of the one or more beams has failed.

28. The non-transitory computer-readable medium of claim 23, wherein the one or more instructions, that cause the UE to receive the indication of the interpretation of the HARQ feedback by the base station, cause the UE to:

receive the indication of the interpretation of the HARQ feedback by the base station via a physical layer indication.

29. An apparatus for wireless communication, comprising:

means for transmitting, using one or more beams, a hybrid automatic repeat request (HARQ) feedback for a downlink transmission from a base station;

means for receiving an indication of an interpretation of the HARQ feedback by the base station;

means for determining that the interpretation of the HARQ feedback by the base station is incorrect, and that interpretations corresponding to a number of previous consecutive HARQ feedbacks were incorrect, wherein the number is at least one;

means for determining that the number of the previous consecutive HARQ feedbacks satisfies a threshold; and means for transmitting, based at least in part on the determination that the threshold is satisfied, a scheduling request to request a new transmission configuration indicator (TCI) state to perform one or more of beam selection or beam switching.

30. The apparatus of claim 29, further comprising, after transmitting the HARQ feedback, storing the HARQ feedback, wherein the means for determining that the interpretation of the HARQ feedback by the base station is not correct comprises:

means for comparing the HARQ feedback that is stored and the indication of the interpretation of the HARQ feedback by the base station.

* * * * *